United States Patent [19]

Holland et al.

[11] 3,818,382

[45] June 18, 1974

[54] SURFACE WAVE DELAY LINE STRUCTURES HAVING REDUCED TEMPERATURE COEFFICIENT OF DELAY TIME

[75] Inventors: Melvin G. Holland, Lexington; Manfred B. Schulz, Sudbury, both of Mass.

[73] Assignee: Raytheon Company, Lexington, Mass.

[22] Filed: June 1, 1972

[21] Appl. No.: 258,802

Related U.S. Application Data

[63] Continuation of Ser. No. 82,250, Oct. 20, 1970, abandoned.

[52] U.S. Cl. ..................... 333/10, 307/221, 310/9.8, 329/104, 332/9 R, 333/30 R

[51] Int. Cl. ........................... H01p 5/14, H03h 9/30

[58] Field of Search ................. 333/10, 30 R, 71, 72

[56] References Cited

UNITED STATES PATENTS

| | | | |
|---|---|---|---|
| 3,154,425 | 10/1964 | Hoover et al. | 333/30 R X |
| 3,311,854 | 3/1967 | Mason | 333/30 R |
| 3,360,749 | 12/1967 | Sittig | 333/30 R |
| 3,548,306 | 12/1970 | Whitehouse | 333/30 R X |
| 3,573,673 | 4/1971 | DeVries et al. | 333/30 R |

*Primary Examiner*—Paul L. Gensler
*Attorney, Agent, or Firm*—Milton D. Bartlett; Joseph D. Pannone; David M. Warren

[57] ABSTRACT

A surface vibratory wave system having signal coupling electrodes wherein the variation in electrical circuit characteristics is reduced by propagating surface waves through the delay medium in directions and/or in temperature ranges where the temperature coefficient of delay time between signal electrodes is substantially reduced.

17 Claims, 11 Drawing Figures

SURFACE WAVE DELAY LINE STRUCTURES HAVING REDUCED TEMPERATURE COEFFICIENT OF DELAY TIME

This is a continuation of U.S. Pat. application Ser. No. 82,250 filed Oct. 20, 1970, now abandoned.

BACKGROUND OF THE INVENTION

Surface wave signal delay systems, wherein an electrical signal is coupled into a sonic delay medium to propagate surface waves, have used the X axis of a y-cut quartz crystal as the direction of surface vibratory wave propagation where it was known that substantial piezoelectric coupling of a signal from the electrical circuitry to the surface waves occurred at room temperature but such systems exhibit a relatively large variation in delay time with changes in temperature and accordingly, structures which are designed for one temperature do not operate properly when the temperature changes. Accordingly, it has heretofore been necessary to operate surface wave devices in closely controlled ovens.

SUMMARY OF THE INVENTION

This invention discloses that crystals have a surface wave piezoelectric coupling coefficient and a surface wave temperature coefficient of delay time which varies with temperature and/or the direction of propagation.

In accordance with the present invention, surface waves may be propagated in directions other than along the X-axis of a Y-cut crystal while still retaining substantial piezoelectric coupling to the signal electrodes, and as a result, variation of the electrical characteristics of a surface vibratory wave system with fluctuations in temperature may be reduced for the operating temperature of the system to less than 25 parts per million.

For example, it has been discovered that surface waves may be piezoelectrically coupled to quartz crystals sliced in a plane whose normal is at some angle, $\theta$, to the Z-axis and which contains the X-axis hereinafter called a rotated y-cut crystal. A useful range of operation is in the region between 0° and 90° of rotation and preferably between approximately 35° and 45° of rotation for operating temperatures between 0° and 100° C.

For the purpose of this invention the definition of crystal orientation used throughout the specification and claims is that set forth in the proceedings of the IRE, Volume 49, pages 1,378–1,395 published in December 1949 and since generally adopted as the standard notation for piezoelectric crystal orientation.

This invention further discloses that other types of crystals can be used in which substantial piezoelectric coupling to surface wave propagation in a crystal can be achieved while maintaining a low temperature coefficient of delay time. For example, a X cut lithium tantalate ($LiTaO_3$) crystal may be used with surface wave propagation in a direction lying between the Y and Z axes.

It is contemplated that the temperature of the surface wave medium can be changed from ambient by heating, or cooling, to achieve an operating temperature for the system which will reduce the temperature coefficient of delay time for the desired direction of surface wave propagation through the medium, thereby reducing variations in electrical system characteristics with temperature fluctuations.

In addition, this invention discloses a wave shaping structure such as a chirp forming network in which the shape of the transducers are chosen to change the shape of the output waveform. By selecting the direction of the surface wave with respect to a given axis in the piezoelectric material, variation in the wave shape due to temperature fluctuations is reduced.

In addition, this invention discloses a band-pass filter in which the shape and position of the skirts of the filter may be maintained substantially constant over a range of temperatures.

Other objectives and advantages of this invention will become apparent as the description thereof reference being had to the accompanying drawings wherein.

DESCRIPTION OF THE PREFERRED EMBODIMENT

Figure 1:
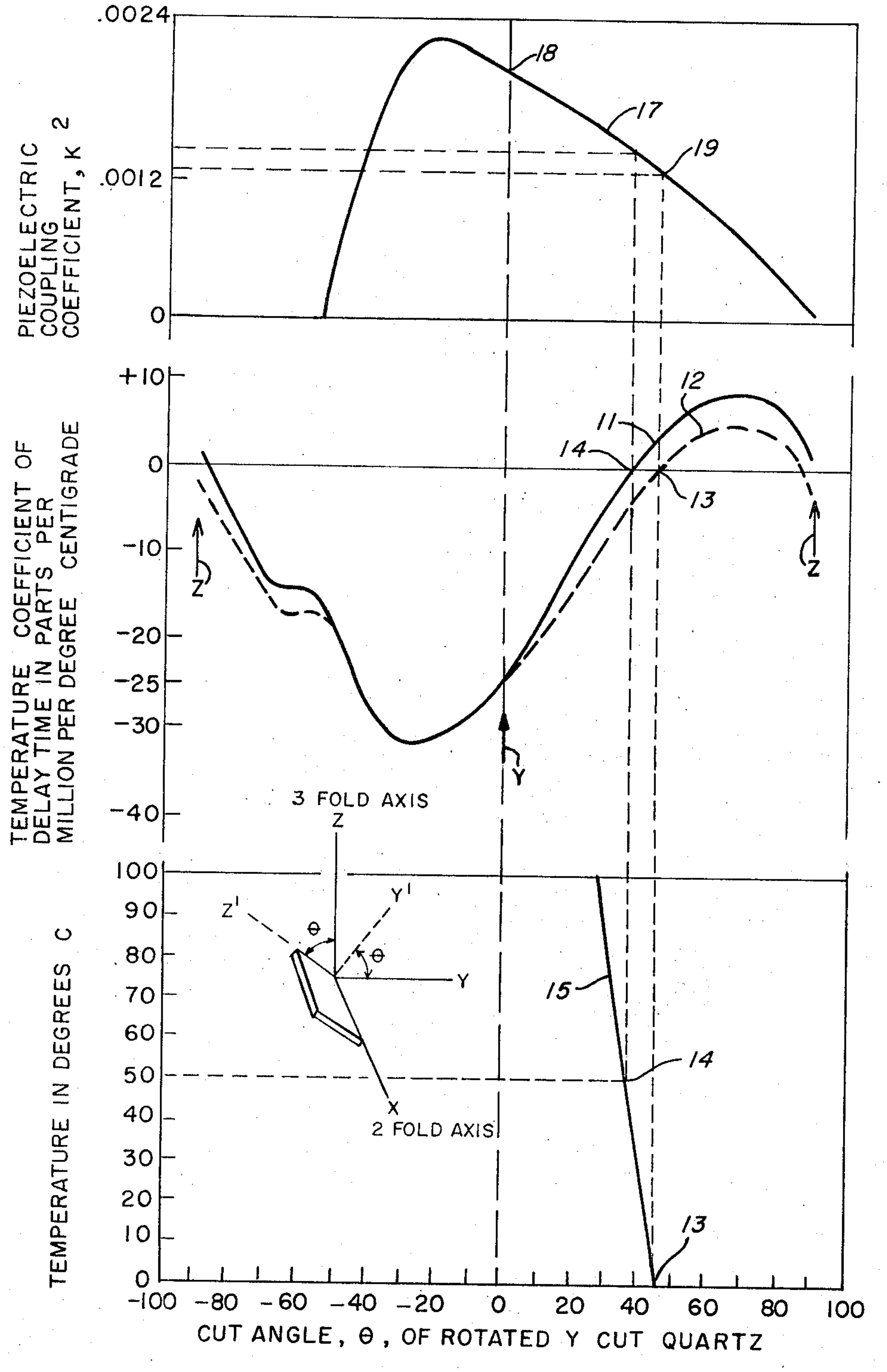
FIG. 1 illustrates diagrams of variation in the temperature coefficient of delay time, piezoelectric coupling coefficient, and temperature of zero temperature coefficient of delay line plotted against the cut angle of a rotated Y-cut quartz crystal.

Referring now to FIG. 1, there is shown a plot of some characteristics of surface wave propagation on a quartz crystal for various angles of rotation of a rotated Y-cut quartz crystal.

The curve 11 illustrates a plot of the temperature coefficient of delay time in parts per million per degree centigrade. This curve is for operation at 50° C, whereas the dotted line curve 12 is for operation at 0° C. At an angle of approximately 46 ½°, the temperature coefficient of delay time is 0, as indicated by point 13, whereas at 50° C the temperature coefficient is 0 at approximately 39 ½°, as shown by point 14.

Curve 15 is a plot of operating temperature for zero temperature coefficient of delay time vs cut angle and points 13 and 14 on this graph correspond to points 13 and 14 on curves 11 and 12. As may be seen, curve 15 is very nearly linear and shows that a wide range of temperatures may be used in which, by proper selection of the angle of rotation of a quartz cut crystal, operation of the device may be made to achieve a low temperature coefficient of delay time.

Some surface wave delay systems can tolerate a moderate variation in electrical characteristics, and hence can be used at ambient or room temperature in the temperature range of, for example, somewhat below 0° C to over 50° C by choosing a rotation angle of a rotated Y-cut quartz crystal of approximately 42° to 44°, such that the temperature coefficient of delay time will vary from approximately −3 parts per million per degree centigrade to approximately +3 parts per million per degree centigrade. The maximum change in delay over this temperature range of operation can be selected to be less than 25 parts per million, and this may be satisfactory for some applications.

Many systems require a smaller variation in the electric characteristics of the system, and this can be achieved by maintaining the operating temperature of the crystal slightly above the upper ambient temperature encountered by the operating system. For example, if the upper ambient temperature is approximately 40° C or slightly over 100° F, the system is chosen to operate with a rotated Y-cut quartz crystal having a cut angle of approximately 40° such that the 0 coefficient of delay time is at slightly below 50° C. A heater supplies heat to the crystal to maintain the crystal within, for example, 10° C of the temperature having a 0 temperature coefficient of delay time indicated approximately at point 14 on curve 11. The maximum fractional deviation of delay time with temperature fluctuations is the integral of the temperature coefficient of delay time over this temperature range and results in a total variation in delay time over this temperature range of between 10 and 15 parts per million. A variation of 10 parts per million in delay time produces a shift of about 400 cycles in a filter skirt operating at a center frequency of 40 megacycles which is within useful limits for many applications such as communications, amplifiers or detectors. Closer temperature control can of course be used if desired. Temperature control would have to be over ten times closer to achieve the same results with a conventional Y-cut quartz crystal at room temperature.

Curve 17 illustrates variation of the piezoelectric coupling coefficient with cut angle of a rotated Y-cut quartz crystal and indicates that substantial piezoelectric coupling can be achieved in the range of cut angles between 0°, indicated by point 18, and 60° indicated by point 19.

Surface wave signal transmission systems must have a sufficient coupling coefficient to achieve the desired frequency response, and for practical systems having reasonable bandwidth, the frequency response must remain relatively constant over the desired operating temperature range in order that variations in temperature will not result in undesirable variations in the signal processing by the surface waves structure. Devices using rotated Y-cut quartz crystal may, for example, propagate surface waves along the X axis with good piezoelectric coupling, and the curves 11, 12, 15 and 17 illustrated in FIG. 1 are for propagation of the surface wave along the X axis.

Variation of the angle of propagation due, for example, to the X axis being a few degrees displaced from the surface of the crystal or the electrodes coupling the surface wave into the crystal being arranged to propagate the wave in a direction a few degrees different from the X axis, either intentionally or by variation in production of crystals, will produce little or no change in the coupling. However, substantially different coupling curves can occur for directions of propagation substantially different from the X axis and may require different cut angles of the crystal cut for the desired operating temperatures in order to achieve the low temperature coefficient of delay time.

Figure 2:
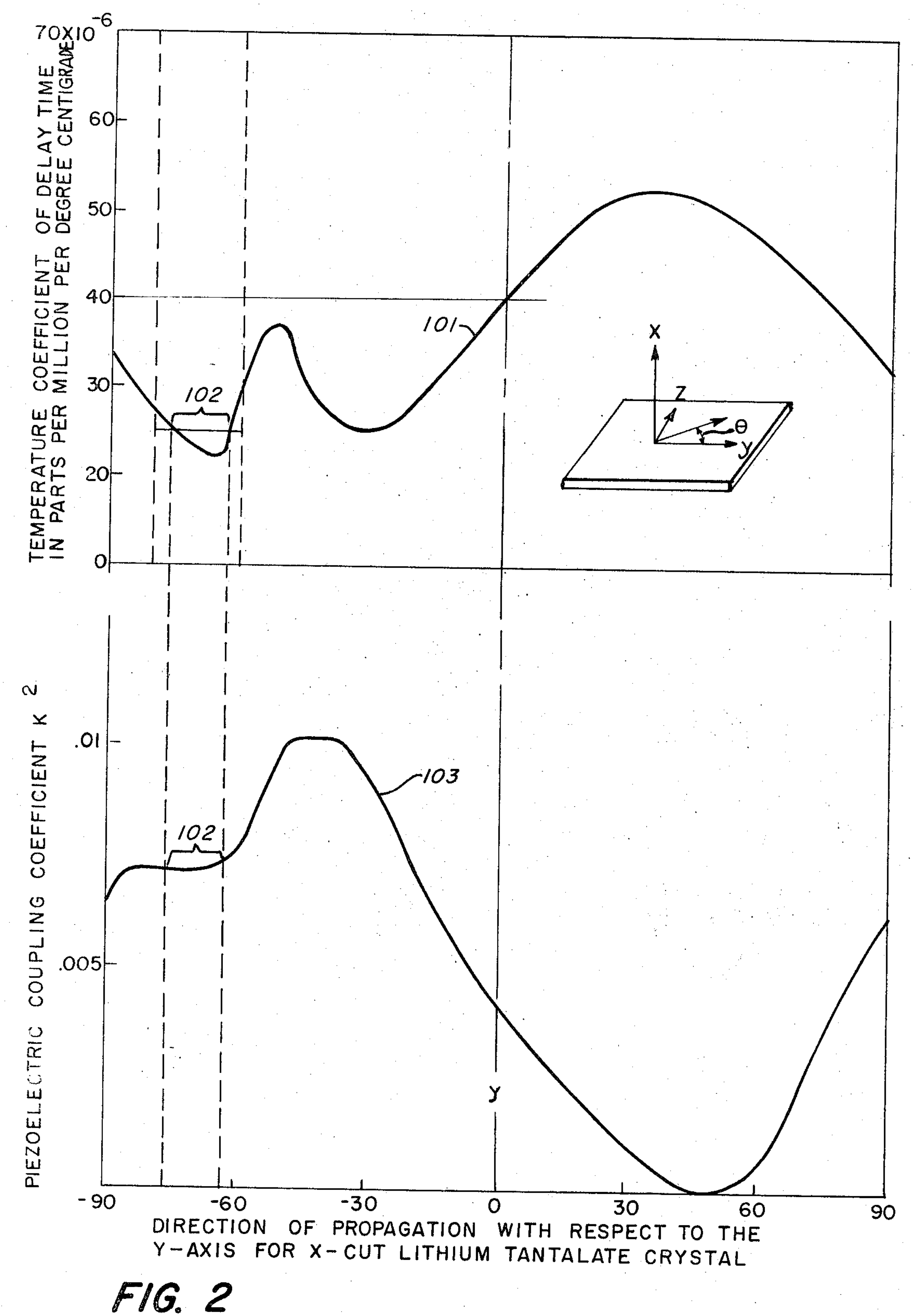
FIG. 2 illustrates diagrams of variation in the temperature coefficient of delay time, and piezoelectric coupling coefficient plotted against the angle of the direction of propagation of a surface wave with respect to the y-axis in an X-cut lithium tantalate crystal.

Referring now to FIG. 2 there is illustrated diagrams of surface wave characteristics of an X cut lithium tantalate crystal plotted against the angle of propagation of the surface wave with respect to the Y axis.

The curve 101 illustrates temperature coefficient of delay time and, as may be seen from this curve, all directions of propagation from 0° to −90° have a temperature coefficient of delay time of less than 40 parts per million per degree centigrade and the portion of the curve lying between approximately −63° and −75° has a temperature coefficient of delay time which is less than 25 parts per million per degree centigrade as indicated at 102. A surface wave delay system using an X cut lithium tantalate crystal operating in region 102 has a temperature coefficient of delay time which is less than 25 parts per million per degree centigrade at room temperature. By changing the temperature, curve 101 can be moved closer to a 0 temperature coefficient of delay time in this region. Thus it is possible to produce a lithium tantalate surface wave delay structure having a low variation of electrical characteristics with temperature.

Curve 103 of FIG. 2, shows the piezoelectric coupling coefficient K (plotted as $K^2$) which, by way of example, has a value of approximately 0.006 to 0.007 in the region 102. The band-pass available in a filter circuit design is limited by coupling coefficient. For example, a 40 megacycle carrier can have a band-pass greater than 3 megahertz in region 102.

Surface waves propagating in directions other than that selected, will not couple as well to the electrode structure. For example waves coming in at right angles to the desired direction, such as +20° would have a $K^2$ of less than 0.002. Thus, it may be seen that by choosing both the plane of the crystal and the direction of propagation along the surface of the crystal different characteristics can be selected to produce optimum system performance.

Figure 3:
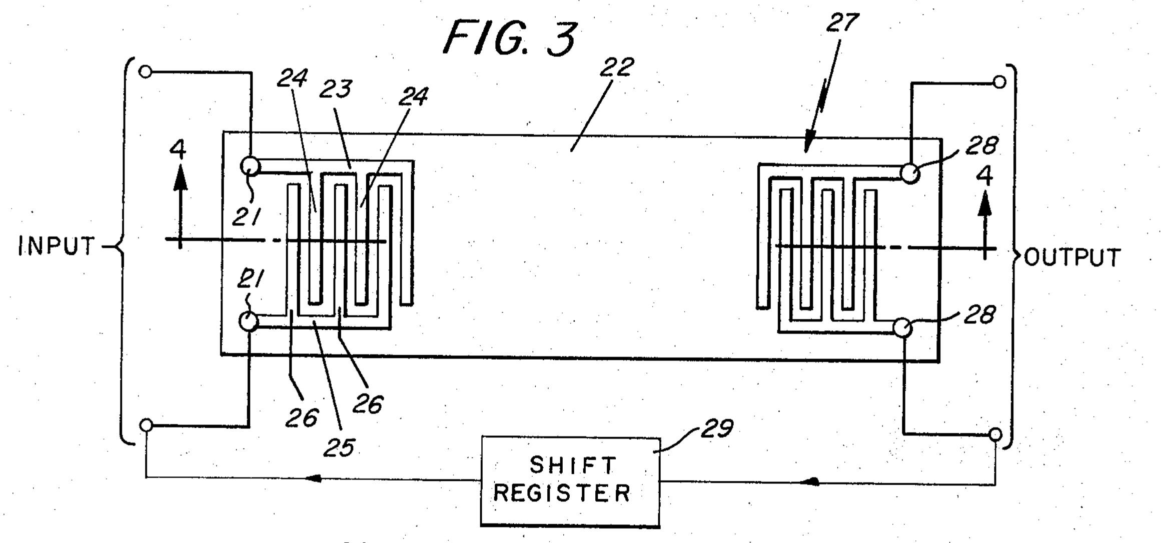
FIG. 3 illustrates a delay line system having input and output coupling structures embodying the invention in a recirculating shift register.
Figure 4:
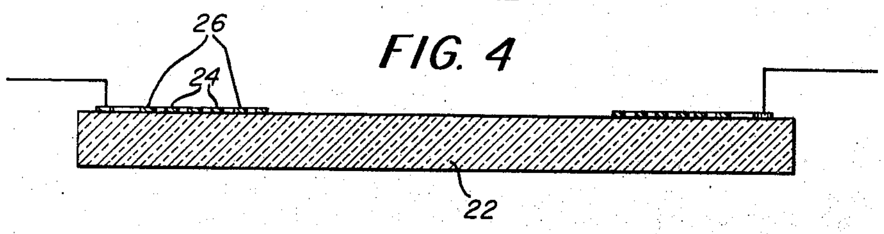
FIG. 4 is a longitudinal sectional view of the structure shown in FIG. 3 taken along line 4—4 of FIG. 3.

Referring now to FIGS. 3 and 4, there is shown a surface wave delay line system used for signal delay purposes in which a signal input is connected to the terminals 21 of an interdigital conductive structure deposited on a piezoelectric crystal 22. The interdigital structure comprises an upper conductor 23 from which fingers 24 extend downwardly and a lower conductor 25 from which fingers 26 extend upwardly between the fingers 24. The shape and spacing of the fingers are indicated by way of illustration only and any desired shape and/or spacing of fingers may be used. In general, the center to center spacing between adjacent fingers is made approximately equal to a half wavelength of the surface wave in the crystal 22 at the desired operating frequency of the device, since this produces the best piezoelectric coupling to the medium 22.

Devices using quartz can operate at frequencies up to 1,000 megahertz efficiently with bandwidths in excess of 10 megahertz with relatively low insertion loss so that pulses of, for example, less than 1/10 of a microsecond may be processed. An output coupling structure indicated generally at 27 feeds output terminals 28, the output signal being, in general, amplified by an amplifier (not shown) to regain the original amplitude of the input signal. The delay time of the system in wavelengths is approximately equal to the distance between the input structure and the output structure divided by the acoustic surface wave velocity. For example, in the structure shown in FIG. 3, this distance between the centers of the input and output structures is approximately 10 wavelengths. The structure shown in FIG. 3 is by way of illustration only and in practice the spacing of the input and output structures could be on the order of 10 inches and the delay could be, for example, greater than 75 microseconds. Such devices are useful in delaying the pulses in a high speed computer, for properly aligning pulse synchronizing circuits in a radar system and for delaying portions of signals in communication systems.

Fingers 24 and 26 may be, for example, thin metal members deposited on piezoelectric body 22 by any well-known techniques such as coating the surface of the substrate with a metal coating and then with a photoresist material, exposing the photoresist to produce a picture of the interdigital structure thereon, finally etching the metal to produce the desired pattern.

As illustrated in FIG. 3 a signal is fed from the output terminal 28 to a shift register 29 and back to the input terminal 21 to form a recirculating delay line system. Such systems are useful for many computer or data processing purposes wherein a series of pulses are dynamically stored in the delay medium, and regenerated by a shift register which may also read out nondestructively the information as it reforms the pulses. The shift register 29 may also be used to read in new information from shift registers connected in parallel therewith or to erase information in the system.

For example, shift register 29 can be a six bit register and have information parallel shifted into all six bits simultaneously from an external source through a register in parallel with register 29 which will feed the information into the input terminal 21. A thousand or more of such six bit words are fed into the terminal 21 and the delay time between the input fingers connected to terminals 21 and the output structure 27 is chosen sufficiently long to store all of these six bit words as pulses in the delay medium 22. The clock driving the shift register may have a rate on the order of 100 megahertz and to store dynamically in the medium 22 a 1,000 six bit words plus a synchronizing bit for each word, a total of 7,000 pulses is stored in the medium 22 and the delay time is approximately 70 microseconds between the input terminals and the output terminals 28.

It is essential that the total delay time remain substantially constant since the shift register 29 will be fed from other portions of an output or data processing system with a fixed clock rate and the pulse appearing at the input of the shift register 29 from the output terminal 27 must be in the proper phase with respect to the clock pulse to enter the shift register, otherwise errors will occur. Accordingly, it is necessary for such systems utilizing surface wave structures to operate with little or no substantial change in delay time. In accordance with this invention, a practical recirculating delay line information storage system using surface wave delay lines may be produced by operating in a temperature range and/or with a direction of propagation of the surface wave where the temperature coefficient of delay time remains low and the piezoelectric coupling coefficient remains substantially constant over a practical operating temperature range.

Figure 5:
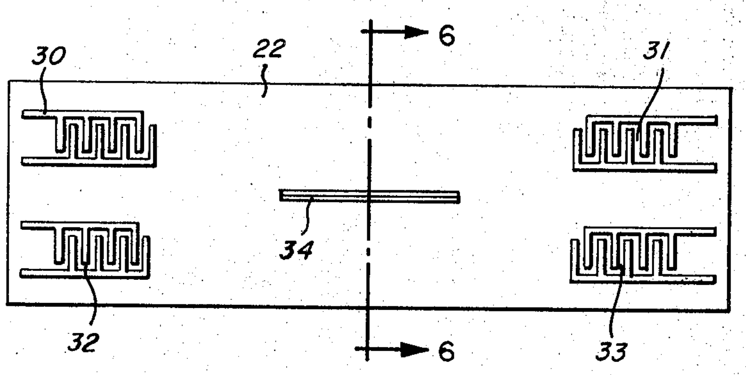
FIG. 5 illustrates a directional coupler embodying the invention.
Figure 6:
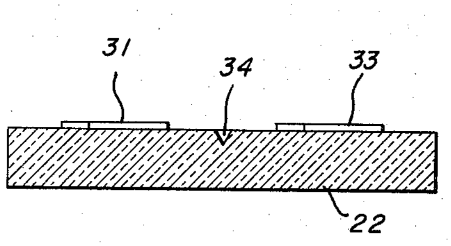
FIG. 6 illustrates a transverse section of the device illustrated in FIG. 5 taken along line 6—6 of FIG. 5.

Referring now to FIGS. 5 and 6 there is shown a directional coupling surface wave delay line structure wherein a piezoelectric medium 22 has a signal input coupling electrode structure 30 and an output coupling electrode structure 31 positioned on medium 22 to couple surface wave signals into the medium 22 and out of the medium 22 along a predetermined directional path through medium 22. A third structure 32 and a fourth structure 33 are spaced on said medium 22 to couple signals through said medium along a directional path substantially parallel to the path of the signals between electrodes 30 and 31, but spaced therefrom and parallel thereto. Positioned on the medium 22 between the paths of the signals connecting electrodes 30 and 31 and electrodes 32 and 33 is a directional coupling structure 34.

As illustrated herein, structure 34 is a V-shaped groove in medium 22 extending parallel to the direction of said paths for a length of several wavelengths of the surface waves traveling in the medium 22. The width and depth of the groove 34 are preferably less than a wavelength of the surface waves in the medium. Signal waves piezoelectrically coupled by electrode 30 into the medium 22 will, on passing the groove 34 have a portion thereof coupled across the groove and propagated in the medium 22 in the same direction to be received by the electrode 33. By adjusting the length of the groove 34 the amount of energy coupled across the groove 34 can be adjusted. Accordingly, the amount of signal energy may be split in accordance with any desired percentage between the terminals 31 and 33. The electrode 32 will normally be terminated in its characteristic impedance to absorb reflected energy.

In such a directional coupler the directional coupling characteristics are dependent upon delay time and accordingly in a practical system the delay time must be maintained substantially constant. In accordance with this invention the directional coupling characteristics may be maintained constant by use of a crystal cut providing a surface wave path orientation having a low temperature coefficient of delay time. The temperature may be selected either as ambient temperature or it may be maintained at an elevated or reduced temperature by relatively inexpensive controls and a direction of surface wave propagation through the medium 22 may be selected which, for the operating temperature is in the region of zero coefficient of delay time. Hence, substantial temperature fluctuations can occur in this temperature region without producing substantial changes in the directional coupling characteristics of the system.

Figure 7:
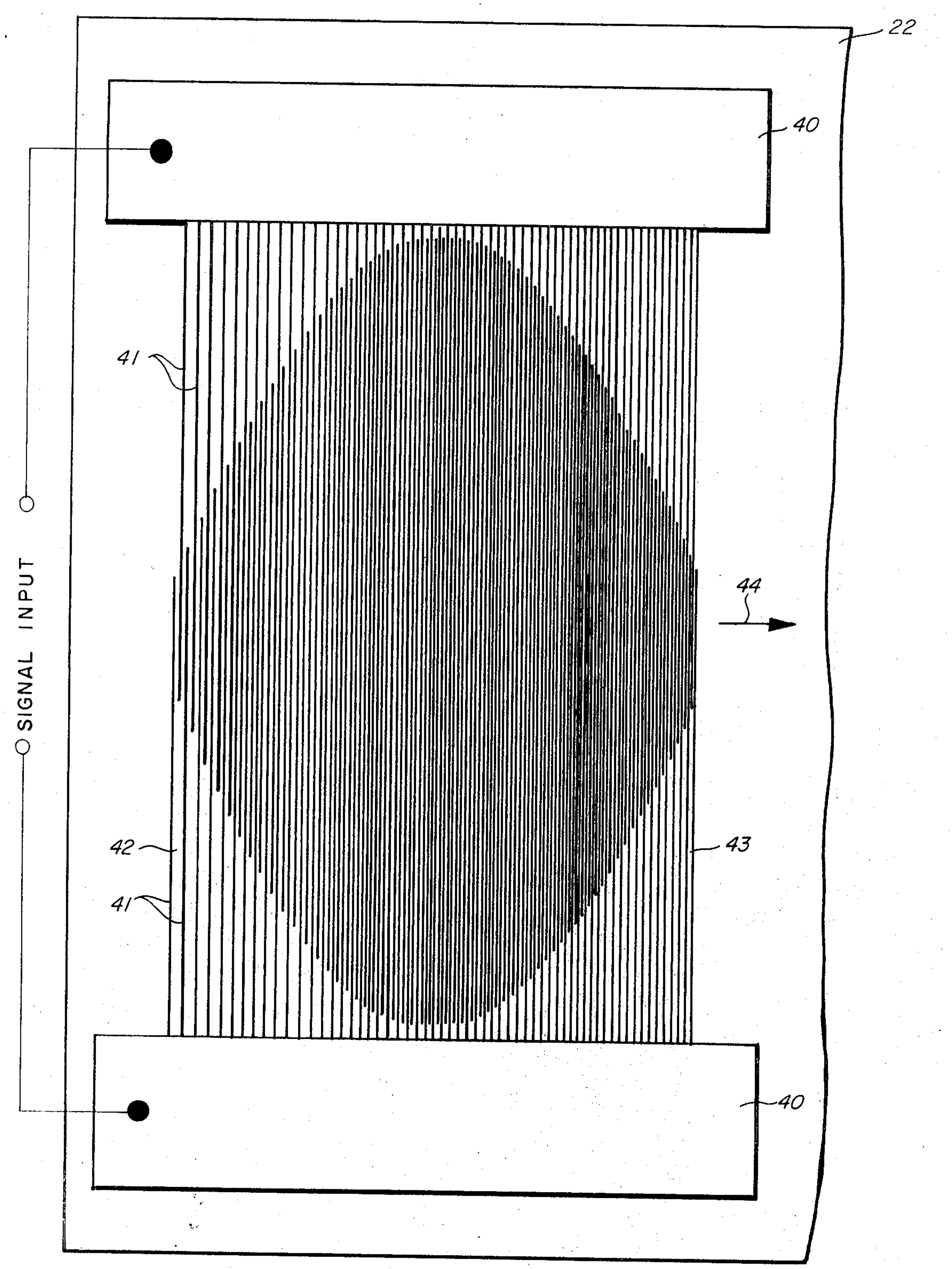
FIG. 7 illustrates a detail view of a coupling structure illustrating variation in interdigital finger spacing and overlap.
Figure 8:
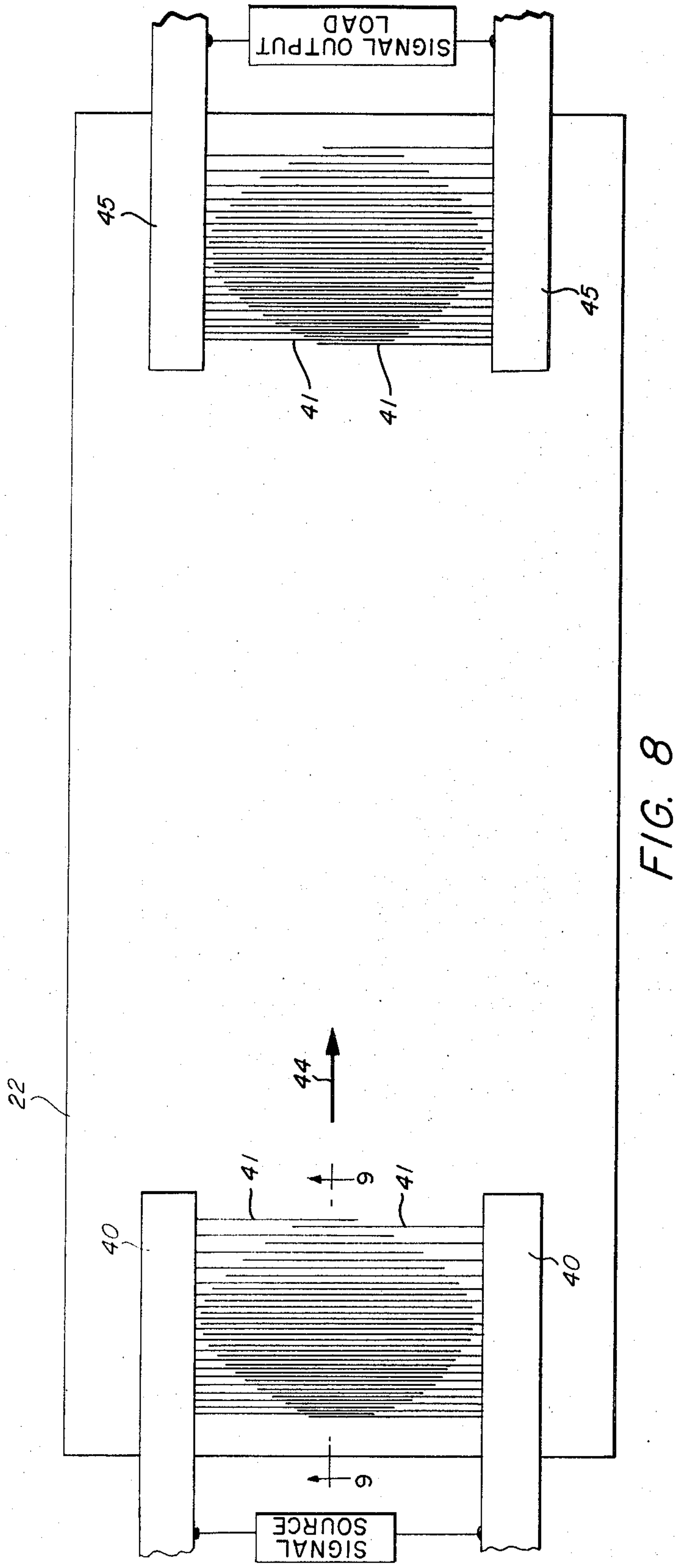
FIG. 8 illustrates a delay line system embodying the coupling structure illustrated in FIG. 7.
Figure 9:
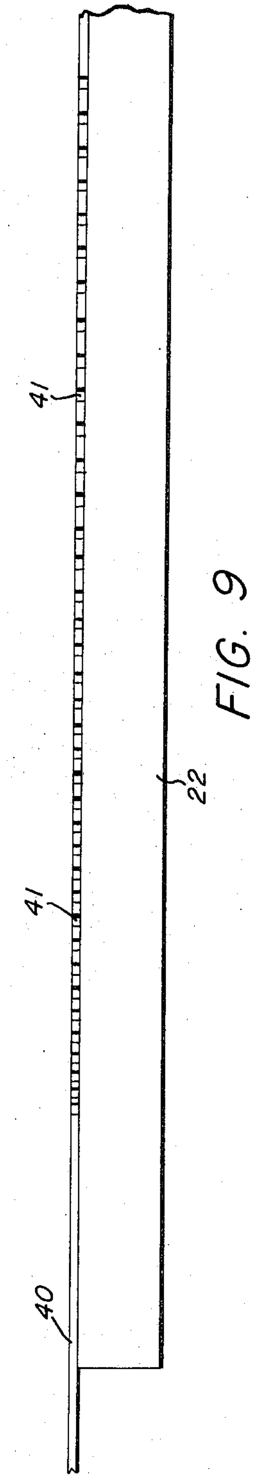
FIG. 9 illustrates a transverse sectional view of one of the structures shown in FIG. 8 taken along line 9—9 of FIG. 8.

Referring now to FIGS. 7, 8 and 9, there is shown a surface wave transmission system in which the spacing and/or coupling applied between adjacent interdigital fingers may be varied to change the waveform coupled into and out of the delay medium. FIG. 7 shows a coupling electrode structure in which interdigital fingers 41 extend in interleaving fashion from a pair of lead-in conductors 40 to which an input signal may be applied. The fingers 41 are spaced further apart on the left-hand end of the input structure, adjacent the input terminals, then at the right-hand end of the structures from which the surface wave progresses along the delay medium 22 as shown by the arrow 44.

Since the space 42 is approximately twice the space 43, and since coupling to the surface wave is greatest for interdigital finger spacings of approximately one-half wavelength at the surface wave velocity, an electrical signal which has a spectrum of frequencies, including those wavelengths in medium 22 which are equal to spaces 42 and 43 respectively, will have the lower frequencies coupled into the medium 22 in the region of the space 42 and the higher frequencies coupled into the substrate in the region of the space 43. The lower frequency surface waves will then lag the higher frequency surface wave for propagation in the direction of the arrow 44.

In FIG. 8 there is shown a medium 22 having two sets of fingers 41, one set extending from input leads 40, and the other set of fingers 41 extending from the output leads 45 which are connected to signal output load. As a result of the different spacings of fingers 41 the lower frequency signals of the surface wave propagated from the input device are coupled to the output lead last since they reach the wider spaced fingers 41 to which they couple best at a later time than the higher frequency signals reach the closer spaced fingers 41 to which they couple best. For example, in such a system, an input impulse will produce an output signal having frequency-time varying characteristic referred to as a chirp.

The characteristics of the device and the output wave-form can be further modified by varying the degree of overlap of the fingers so that the fingers at each edge of the sets of fingers overlap the least, whereas the fingers in the middle of the comb of fingers overlap the most. Since the degree of overlap for a given amplitude of signals determines the total amount of energy coupled into the surface wave, the degree of coupling to the medium 22 can be further selected by this means to further shape the waveform and/or to reduce undesired or spurious signals.

The characteristics of such wave transorming or altering circuits require that the signal wave delay times remain constant and since this characteristic changes substantially with changes in ambient temperature for X-axis propagation of surface waves in Y-cut quartz crystals, such systems have not been commercially feasible. However, in accordance with this invention, the temperature coefficient of delay time may be made low over the operating temperature range which can be room temperature or any desired temperature above or below room temperature. As a result, the desired wave transformation or alteration will remain substantially constant over substantial fluctuations in temperature.

Figure 10:
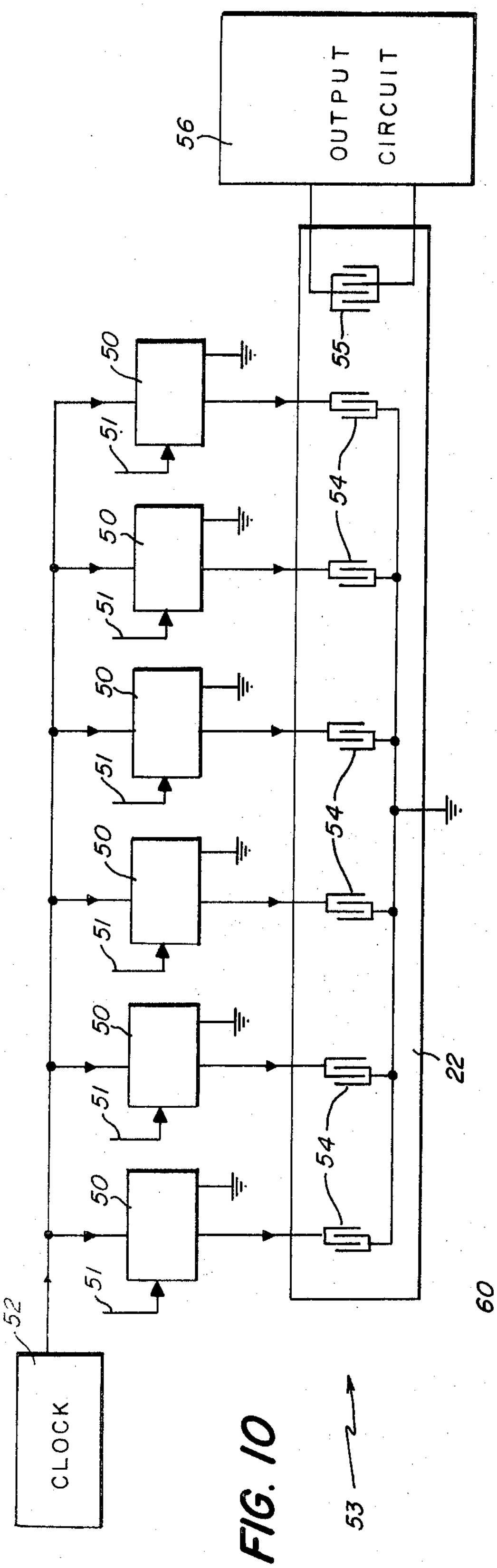
FIG. 10 illustrates a surface wave delay line structure embodying the invention as a shift register.

Referring now to FIG. 10, there is shown an embodiment of this invention in a data handling shift register. A series of input registers 50 have individual data input buses 51 to which individual pulses of data may be applied. A source of clock pulses 52 cyclically strobes the contents of the bit register 50 into a series shift register 53 consisting of a surface wave delay line substrate 22 having sets of fingers 54 deposited on the surface thereof. As shown in this embodiment, there are six sets of fingers 54 individually connected to the outputs of the registers 50 so that if a bit is present in one of the bit register 50, the clock pulse will strobe it into the series shift register 53 and it will be coupled through the set of fingers 54 connected to that bit register into the medium 22 as a surface wave pulse which will travel down the medium 22 to a set of output fingers 55 which are connected to an output utilization circuit 56. Thus, at every clock pulse a series of pulses will be introduced into the substrate 22 and will be serially read out by the output set of fingers 55.

Such circuits are used, for example, to supply input data to computers from memory systems or from data input systems. In such systems it is essential that the time between the series of pulses be maintained substantially constant so that pulses do not enter the input to the utilization circuits at the improper time. Thus, it is important that the delay time be maintained substantially constant over the desired operating temperature range of the system. By the use of X-axis propagated waves on a selected rotated Y-cut quartz crystal, the temperature coefficient of delay time may be maintained at substantially zero in the region of the desired operating temperature while still retaining good coupling efficiency between the interdigital signal electrodes and the substrates.

Figure 11:
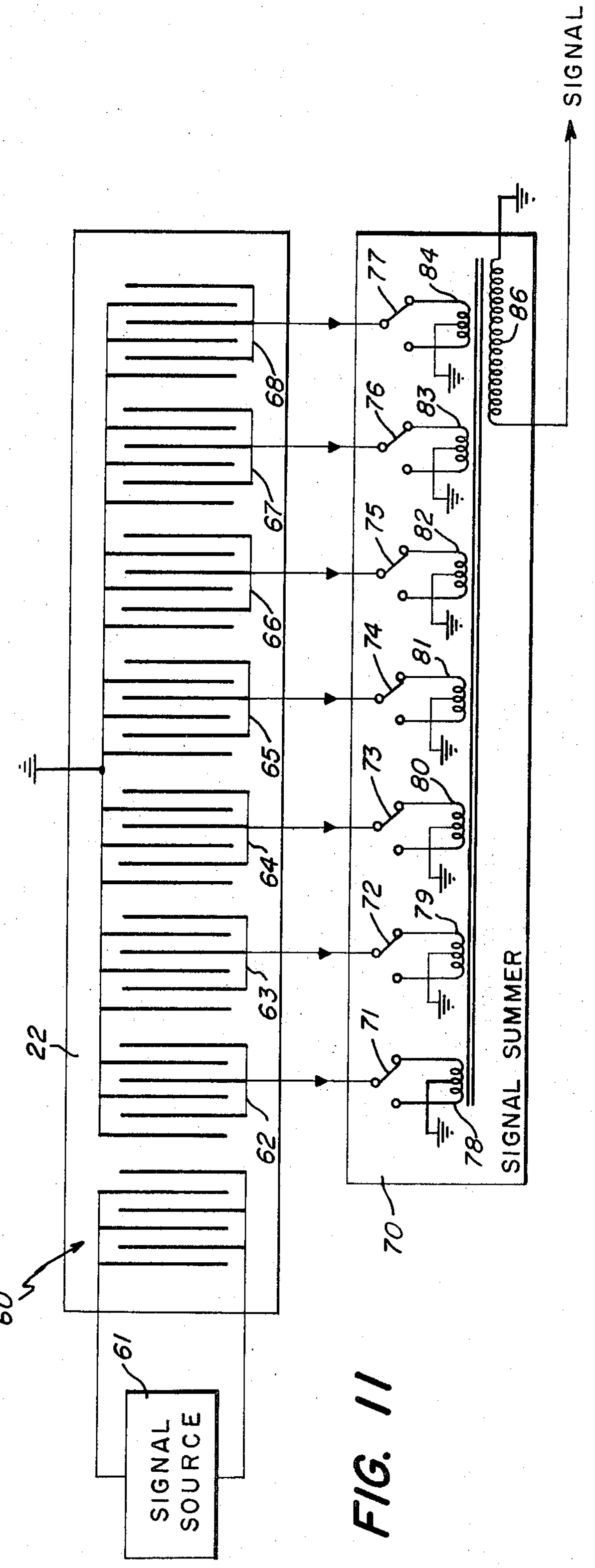
FIG. 11 illustrates a surface wave delay line structure embodying the invention in a digitally controlled phase modulation system.

Referring now to FIG. 11, there is shown a surface wave delay line structure embodying the invention in a digital phase modulator or demodulator system. The medium 22 has a signal electrode coupling structure 60 fed from an input signal source 61 which launches a surface wave signal of, for example, 60 megacycles in substrate 22. A series of signal wave output coupling electrode structures, comprising sets of interdigital fingers, are designated as 62–68, respectively. One side of each set of fingers is connected to a common ground and the other side connected to a signal processor 70 which is functionally illustrated as single pole double throw switches 71–77 respectively, and centertapped transformer windings indicated at 78–84 respectively. Transformer winding 86 supplies an output signal.

Switches 71–77 are set in accordance with a digital code in any desired position and an output signal pulse of, for example, one microsecond, applied from signal source 61 will then produce an output signal at winding 86, the shape and phase position of the signal components being determined by the position of the switches. While as shown here, there are seven output sets of output fingers which permit phase modulation in accordance with a code such as the Barker code, any desired number of fingers sets could be used. In addition, the spacing and amount of overlap of the fingers as well as the number of fingers in each group may be selected to produce the desired degree of coupling. Preferably, the outputs from each of the sets of fingers 62–68 is made equal and for this purpose the turns ratio on each of the transformer primaries is chosen for impedance matching. Alternatively, the number of fingers in each of the finger groups may be progressively increased, the degree of overlap of each of the sets of fingers may be progressively increased or a resistive voltage divider network may be placed in each of outputs of the fingers 62–69.

The signal summer 70 used to sum up the outputs of the finger sets 62–68 is diagrammatic and, by way of example only, and high speed switches such as field effect transistors may be used to operate as switches in a well-known manner. The digital code output from the transformer winding 86 would be, for example, a 60 megacycle pulse having portions thereof phase shifted in accordance with a digital code.

The coded pulse can be detected by sending such a signal down the delay line from the comb 60 so that the coded pulse will at some time be delivering energy to each of the output electrodes 62–68 simultaneously. The outputs of these electrodes are fed through switches 71–77 which when placed in the appropriate switch positions to receive the code will result in all of the signals adding up in the transformer winding 86 to produce a maximum signal. Thus, such a device can be used to detect a coded signal in background information or noise.

In order to be effective, the system must maintain accurate phase relationships between the various electrodes and this requires that the delay time in the medium 22 be maintained substantially constant. In accordance with this invention, such a system may be made practical by propagating surface waves through the medium 22 in a direction which has a good coupling coefficient and a low or substantially zero temperature coefficient of delay time over the operating temperature range of the system. Variations in temperature in the region of the zero temperature coefficient of delay time will produce substantially less variation in delay time than variation in temperature in the region of the −24 parts per million per degree centigrade temperature coefficient of delay time encountered in Y-cut quartz crystal at room temperature, and adequate piezoelectric coupling of the signal electrodes to the medium is preserved.

This completes the description of the embodiments of the invention illustrated herein. However, many modifications thereof will be apparent to persons skilled in the art without departing from the spirit or scope of this invention. For example, the invention can be used for any type of filter such as a bandpass, bandstop, or equalizing filter using surface wave structures. Additional temperature compensation means may be employed, such as applying thin layers of different materials to the surface of a quartz crystal. The electrode coupling structures need not necessarily be deposited on the quartz crystal, but may be attached to an auxiliary electrode holding structure such as a glass plate positioned adjacent the surface of the crystal and having a different temperature coefficient of thermal expansion to additionally reduce the overall temperature coefficient of delay time over a wide range of temperatures, and many means and methods such as resistive heaters or cooling structures may be used to adjust or maintain a desired temperature. Accordingly, it is contemplated that this invention is not limited to the details of the particular embodiments illustrated herein except as defined by the appended claims.

What is claimed is:

1. In combination:

a surface wave vibratory transmission medium having at least one substantially smooth surface and different temperature coefficients of velocity for different directions of propagation of surface waves therein comprising a rotated Y-cut crystal, said propagation of surface waves being substantially along the X axis of said crystal, and the rotation angle of said crystal being between 39-½° and 46-½° first means for coupling electrical signals to a first region of said surface directly as surface waves for propagating waves in said medium substantially adjacent said surface of said medium; and second means coupled to a second region of said surface for extracting signals from said surface waves, the amount of coupling between said first and second means being different for different frequencies.

2. The combination in accordance with claim 1 wherein said first and second means comprise interdigital structures.

3. The combination in accordance with claim 2 wherein said medium comprises quartz.

4. The combination in accordance with claim 3 wherein:

said first means comprise a plurality of interdigital fingers in which the spacing between adjacent fingers varies as a predetermined function of distance along said X axis.

5. In combination:

a surface wave vibratory transmission medium having at least one substantially smooth surface and different temperature coefficients of velocity for different directions of propagation of surface waves therein comprising a rotated Y-cut crystal, said propagation of surface waves being substantially along the X axis of said crystal, and the rotation angle of said crystal being between 39-½° and 46-½°;

first means for coupling electrical signals to a first region of said surface directly as surface waves for propagating waves in said medium substantially adjacent said surface of said medium in a direction having a temperature coefficient of velocity which is less than 25 parts per million per degree centigrade over the operating temperature range of said medium;

second means coupled to a second region of said surface for extracting signals from said surface waves and;

means for feeding back at least a portion of the signals extracted by said second means to said first means.

6. The combination in accordance with claim 5 wherein said first and second means comprise input and output coupling structures having interdigital fingers wherein the spacing between said interdigital fingers is varied.

7. The combination in accordance with claim 5 wherein said first and second means comprise interdigital structures.

8. The combination in accordance with claim 7 wherein said interdigital structures are positioned adjacent said medium and is piezoelectrically coupled to said surface waves.

9. The combination in accordance with claim 8 wherein said medium comprises quartz.

10. In combination:

a surface wave vibratory transmission medium;

means for propagating surface waves in said medium in a direction having a temperature coefficient of velocity which is less than 25 parts per million per degree centigrade over the operating temperature range of said medium;

said propagating means comprising an interdigital structure positioned adjacent said medium and piezoelectrically coupled to surface waves in said medium;

said medium comprising quartz;

said propagation of surface waves being substantially along the X axis of a rotated Y-cut crystal;

said propagating means comprising a signal input structure and a signal output structure; and means for recirculating the signal between said output structure and said input structure through a shift register.

11. In combination:

a surface wave vibratory transmission medium;

means for propagating surface waves in said medium in a direction having a temperature coefficient of velocity which is less than 25 parts per million per degree centigrade over the operating temperature range of said medium;

said propagating means comprising an interdigital structure positioned adjacent said medium and piezoelectrically coupled to surface waves in said medium;

said medium comprising quartz;

said propagation of surface waves being substantially along the X axis of a rotated Y-cut crystal;

said propagating means comprising a signal input structure and a signal output structure; and means in said medium for directly coupling said surface waves from one path in said medium to an adjacent path in said medium.

12. In combination:

a surface wave vibratory transmission medium;

means for propagating surface waves in said medium in a direction having a temperature coefficient of velocity which is less than 25 parts per million per degree centigrade over the operating temperature range of said medium;

said propagating means comprising an interdigital structure positioned adjacent said medium and piezoelectrically coupled to surface waves in said medium;

said medium comprising quartz;

said propagation of surface waves being substantially along the X axis of a rotated Y-cut crystal;

said propagating means comprising a signal input structure and a signal output structure; and said input and output coupling structures comprising a series to parallel shift register.

13. In combination:

a surface wave vibratory transmission medium;

means for propagating surface waves in said medium in a direction having a temperature coefficient of velocity which is less than 25 parts per million per degree centigrade over the operating temperature range of said medium;

said propagating means comprising an interdigital structure positioned adjacent said medium and piezoelectrically coupled to surface waves in said medium;

said medium comprising quartz;

said propagation of surface waves being substantially along the X axis of a rotated Y-cut crystal;

said propagating means comprising a signal input structure and a signal output structure; and said coupling structures comprising a digital phase modulator or detector.

14. The combination in accordance with claim 13 wherein said medium comprises lithium tantalate.

15. The combination in accordance with claim 14 wherein said medium constitutes an X-cut crystal.

16. The combination in accordance with claim 15 wherein the direction of propagation of signal waves is substantially along a rotated Y axis.

17. The combination in accordance with claim 16 wherein the rotation of said Y axis is in the range of −60 to −90°.

* * * * *

UNITED STATES PATENT OFFICE
CERTIFICATE OF CORRECTION

Patent No. 3,818,382 Dated June 18, 1974

Inventor(s) Melvin G. Holland et al.

It is certified that error appears in the above-identified patent and that said Letters Patent are hereby corrected as shown below:

The illustrative figure should appear as shown on the attached sheet.

Signed and Sealed this

*thirtieth* Day of *September 1975*

[SEAL]

*Attest:*

RUTH C. MASON
*Attesting Officer*

C. MARSHALL DANN
*Commissioner of Patents and Trademarks*

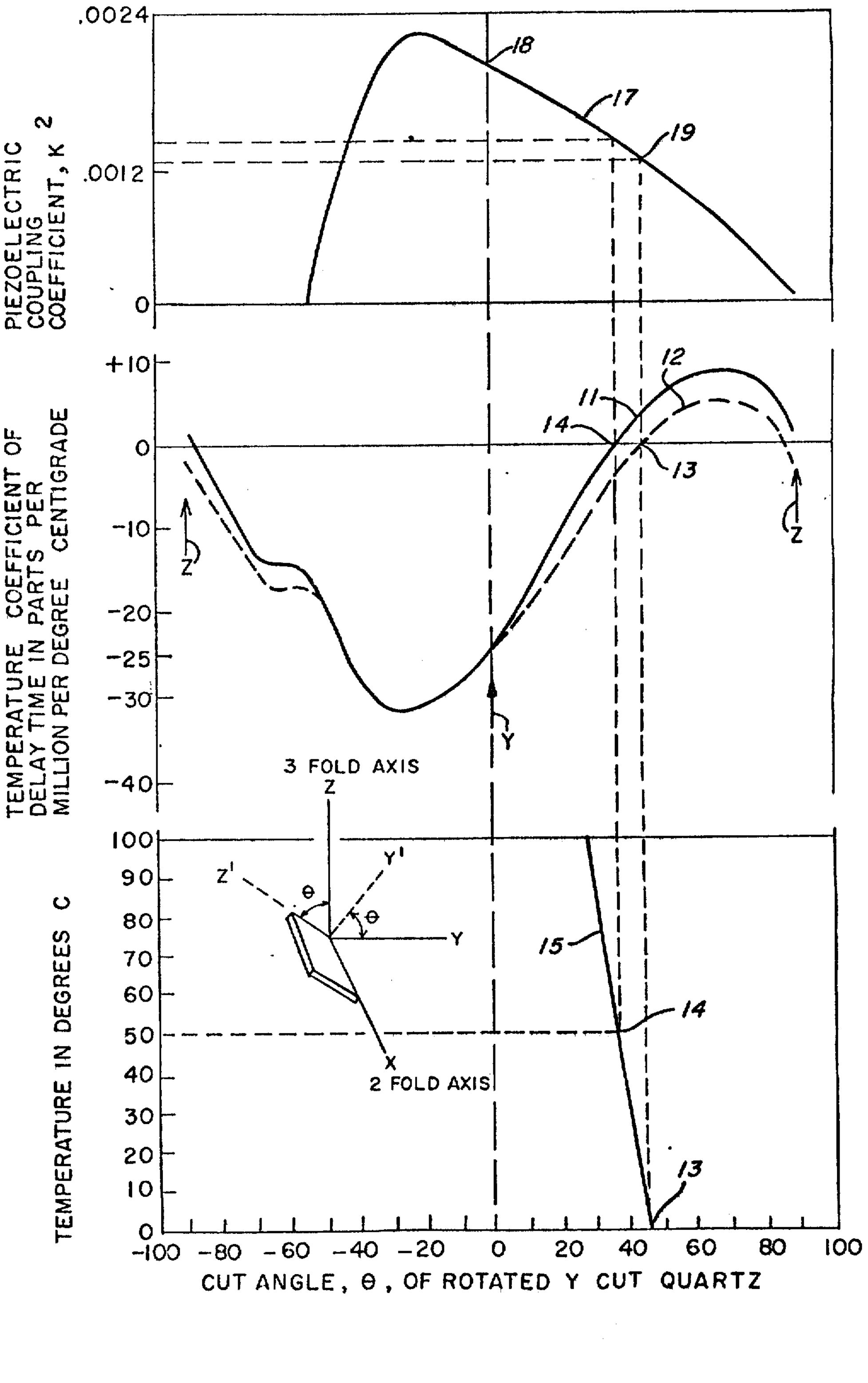
.0024
.0012
0
PIEZOELECTRIC COUPLING COEFFICIENT, K 2
18
17
19
+10
0
-10
-20
-25
-30
-40
TEMPERATURE COEFFICIENT OF DELAY TIME IN PARTS PER MILLION PER DEGREE CENTIGRADE
12
11
14
13
Z
Y
3 FOLD AXIS
Z
Z'
Y'
θ
θ
Y
X
2 FOLD AXIS
100
90
80
70
60
50
40
30
20
10
0
TEMPERATURE IN DEGREES C
15
14
13
-100 -80 -60 -40 -20 0 20 40 60 80 100
CUT ANGLE, θ, OF ROTATED Y CUT QUARTZ